A. E. CRUM.
VALVE.
APPLICATION FILED JULY 8, 1911.
1,087,730.
Patented Feb. 17, 1914.
2 SHEETS—SHEET 2.
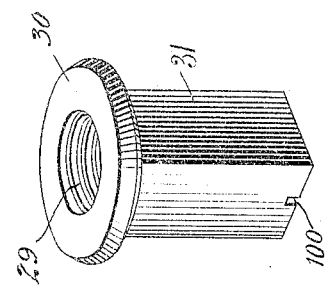
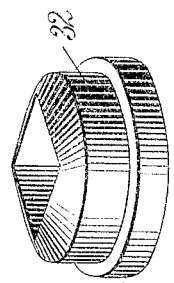
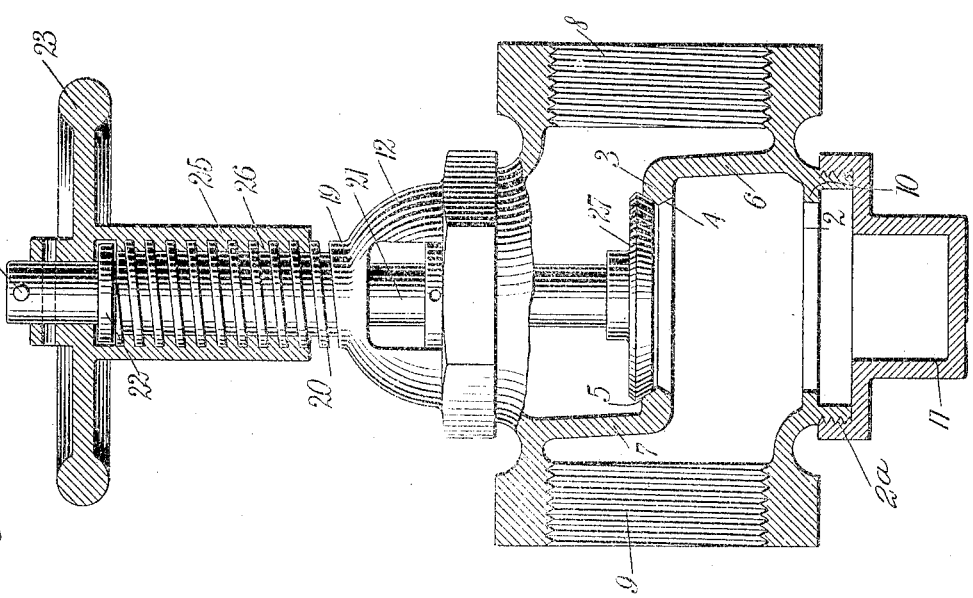
WITNESSES
Edward Thorpe
L. J. Gallagher
INVENTOR
Archie E. Crum
BY
ATTORNEYS

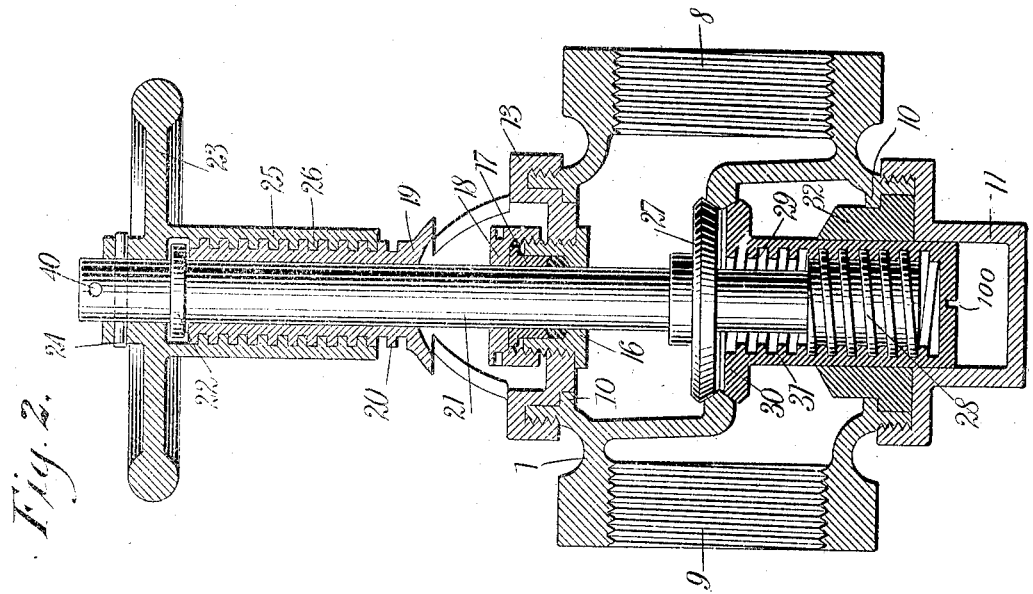
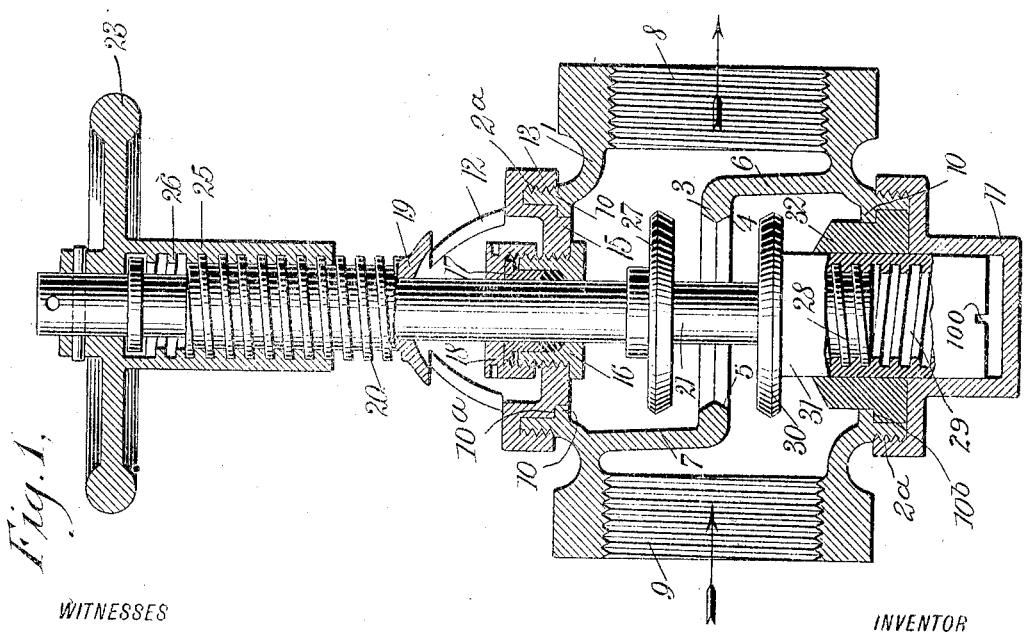

UNITED STATES PATENT OFFICE.

ARCHIE E. CRUM, OF MOBILE, ALABAMA.

VALVE.

1,087,730.  Specification of Letters Patent.  Patented Feb. 17, 1914.

Application filed July 8, 1911. Serial No. 637,421.

*To all whom it may concern:*

Be it known that I, ARCHIE E. CRUM, a citizen of the United States, and a resident of Mobile, in the county of Mobile and State of Alabama, have invented a new and Improved Valve, of which the following is a full, clear, and exact description.

My invention relates generally to valves, and, more particularly, to a structure comprising a casing which permits the use of parts whereby a double-acting or a single acting valve construction is provided.

One of the principal objects of the invention is to provide a valve which, when used as a double-acting valve, comprises coöperating parts, whereby the lower and upper valves may be accurately adjusted on their seats when the valve is being assembled or in taking up the slack from wear.

A further object of the invention is to provide a valve having operating means exteriorly of the valve casing, whereby the threads used in operating the valve are in convenient position for cleaning, inspecting, and oiling, while the valve is in use under pressure, the said threads being out of contact with the steam, thereby providing for greater durability and lower temperature of such parts.

A further object of my invention is the provision of a valve casing with a plurality of valves adapted for conjoint use, one of the valves being adapted to be used alone, whereby an improvement in this art is provided.

Reference is to be had to the accompanying drawings, forming a part of this specification, in which similar characters of reference indicate corresponding parts in all the figures, and in which—

Figure 1 is a vertical sectional view of the valve in open position; Fig. 2 is a similar view in closed position; Fig. 3 is a similar view showing but one closing valve in use; Fig. 4 is a perspective view of the lower closing valve; and Fig. 5 is a perspective view of the bearing member for the lower valve shown in Fig. 4.

The body member or casing 1 has similar openings 2 at diametrically opposite points, the double valve seat 3 having the tapered sides 4, 5 and being positioned substantially at a central point within the casing, said seat being supported by the upstanding parts 6, 7. The casing is adapted for connection to suitable pipes by means of threaded openings 8, 9. Adjacent the openings 2 and on the exterior thereof are screw threads $2^a$ of similar pitch adapted to hold closure members in position.

As shown particularly in Figs. 1 and 2, the closure member for the upper opening 2 is in the form of a bonnet 12 having a circular flange 13 thereon provided with screw threads adapted to coöperate with the threads adjacent the upper opening 2. At a central point on the lower portion 15 of the bonnet, a circular opening is provided into which a gland 16 is adapted to be positioned; this gland receives packing material 17 in any desired quantity, said packing material being retained in position by means of a cap 18. The upper portion 19 of the bonnet is of cylindrical construction, having a plurality of threads 20 on its outer surface and extending longitudinally thereof, the valve stem 21 being concentric with the threads 20 and extending through this cylindrical portion 19 and also through the packing 17 and gland 16 into the interior of the casing. Adjacent the upper end of the stem 21, a shoulder 22 is provided, which is adapted to coöperate with the central portion of a handle 23 secured to the stem by means of a pin 24, the under side of the handle being provided with a downwardly-extending cylindrical portion 25 having a plurality of screw threads 26 formed on its interior coöperating with the threads 20 formed on the exterior of the portion 19. A suitable valve 27 is secured to the stem 21 and within the casing 1, the lower end of the stem beyond the valve being provided with a plurality of threads 28. These threads engage in similar threads 29 formed on the interior of the extending portion 31 of the lower valve 30. This extending portion (shown particularly in Fig. 4) is positioned within a suitable opening in a bearing 32 which is contained within the lower opening 2 in the casing 1 and maintained in such position by means of the closure member 11.

Referring particularly to Fig. 1, it will be noted that within the openings at the opposite sides of the casing are the shoulders 10 which extend around and inside the openings; the flange 13 which carries the gland and the packing material is provided with a shoulder $10^a$ which is adapted to lie closely against and engage the shoulder 10 within the upper opening. The beforementioned bearing 32 which is contained within the lower opening 2 is provided with a shoulder 10$^b$ adapted to lie closely against the shoulder 10 within this lower opening, whereby the bearing is accurately positioned and movement within the opening is prevented after the parts are assembled.

The handle 23 being secured on the stem 21, turning of the handle in one direction will turn the stem and will also advance it through the portion 19 of the bonnet 12 by reason of the screw-threaded engagement between the part 25 of the handle and the part 19 of the bonnet, and will bring the valve 27 away from the seat 3; this same movement also lowers the other valve 30 because of the threaded engagement between the lower end 28 of the stem and the portion 31 of this valve. Of course, turning the handle in the opposite direction brings the two valves toward each other and seats them on the tapered edges 4, 5 respectively, of the valve seat, thereby effectively closing the valve.

It is to be particularly noted that by placing the threads on the exterior of the portion 19 of the bonnet and placing the coöperating threads on the handle 23, I set forth a construction which exposes the screw threads, thereby making them available for cleaning and oiling, and provide a more secure and rigid construction since all the parts within the casing are perfectly plain. By reason of the fact that the openings 2 in the casing are at diametrically opposite points, and that the construction of the casing adjacent each one of these openings is similar to the construction of the other, the casing may be securely tightened in position and the valves inserted later, this arrangement permitting the stem to project from either side of the casing as may be most desirable.

As shown particularly in Fig. 3, the lower valve may be omitted and the upper valve 27 used by itself. In this case the lower closure member 11 is placed in position over the lower opening 2 and provides a tight joint. In this arrangement, however, the pin 24 adjacent the top of the stem is withdrawn from the transverse opening in the handle 23 and is inserted directly into the opening 40 at the top of the stem. The shoulder 22 on the stem bears against the under side of the handle and the pin bears against the upper side of the handle, so that a turning of the handle with the consequent movement thereof, causes the stem and the valve 27 to approach or come away from the valve seat 3. In this method of operation, the stem 21$^a$ moves directly up and down, no turning movement thereof taking place.

In order to permit grinding of the lower valve 30, I have provided a slot or equivalent construction, 100, in the lower end thereof which is adapted to be engaged by a screw-driver or grinding tool; the upper valve 27 may be conveniently ground by removing the lower valve and engaging the stem 21 in any suitable tool whereby it may be turned.

By making the extending portion 31 of the lower valve 30 square in cross-section, I have insured the correct positioning of the valve, when once adjusted; the threads on the bonnet 19 being equal to and in the same direction as the threads 29 in the interior of this lower valve, the travel of both valves is equal and the lower one is held against turning and consequent disarrangement.

The valve as shown in Figs. 1 and 2, may be taken apart, to a certain extent, and repairs made in the interior thereof in the following way even though pressure is maintained on one side of the valve. By removing the bonnet 12 and turning the stem 21 to free the lower end thereof from engagement with the portion 31 of the lower valve, the stem and upper valve 27 may be entirely withdrawn, the lower valve 30, however, being securely maintained in position against the valve seat 3 by reason of the pressure back of the valve. With the parts in this position, the upper valve may be repaired or the valve and stem may be renewed, or various other changes may be made without the necessity of removing the pressure to the left of the valve.

It is to be noted that the bearing 32, provided with the shoulder 10$^b$ enters into the opening in the lower portion of the valve casing and that the lower valve 30 with its extending portion 31 is positioned within the opening in this bearing. The opening in the bearing (Fig. 5) is preferably non-circular and the extending portion 31 of the valve is similarly shaped so that with the bearing maintained rigidly in position, the lower valve is given a movement which is non-rotatable whenever the stem is turned. It is of some consequence in double-acting valves that the valves seat themselves simultaneously; in the present construction, the upper valve 27 may be properly seated, after which the lower valve may be entered into the opening in the bearing 32 with the threads on the stem 21 engaging the threads 29, the lower valve being brought home or seated by turning the bearing and the valve with a suitable tool as described. With the lower valve thus seated, it may be maintained permanently in such position by placing the lower closure member 11 in position, this closure member turning freely and not interfering or engaging with any part of the lower valve. The engagement between the lower portion of the bearing 32 and the closure member 11 holds the bearing secured in position so that consequent turning of the handle or turning of the valve stem will move the valves simultaneously in opposite directions, the valves always coming back adjacent the seats at the same instant. As previously mentioned, the lower valve may be conveniently ground by merely removing the upper valve and the closure member 11 and turning the bearing 32 and the valve by means of a suitable tool.

A consideration of the drawings and the specification will bring out the following facts. By reason of the similar construction adjacent the openings at opposite sides of the valve casing, the spindle 21 may be brought into position within the valve in either opening; this is an advantage in that the valves may be reversed in the event of a reversal of fluid passing through the pipes. The particular construction of the bonnet and the operating means for the spindle provide for cool parts, thereby making operation of the valve quicker and simpler; it is also worthy of note that, when the upper valve is fully opened, the engagement of the top portion of this valve with the gland makes a steamtight joint or bearing enabling the valve to be repacked while in use and also relieving the packing of pressure when the valve is opened; finally the arrangement of the parts as a whole makes for a construction which is new and useful, the inventive idea involved being included within the spirit of the appended claims.

Having thus described my invention, I claim as new and desire to secure by Letters Patent:

1. A valve comprising a casing having an opening therein and an internal shoulder adjacent the opening, a bearing having a non-circular opening extending therethrough and provided with a shoulder, the bearing being positioned in the opening in the casing with its shoulder in engagement with the shoulder of the casing, a valve having a non-circular extending portion engaging in the opening in the bearing, means for moving the valve within the bearing, and means for engagement with the bearing and carried by the casing for holding the bearing in position.

2. A valve comprising a casing having an opening therein, a shoulder within the casing and adjacent the opening, a bearing positioned within the opening, the bearing being provided with a shoulder for engagement with the first shoulder, whereby the position of the bearing is determined, a non-circular opening extending through the bearing, a valve provided with an extending portion similar in shape to the opening in the bearing, the said portion engaging in the said opening in the bearing, means for moving the valve, and a closure member carried by the casing and engaging the bearing, whereby the position of the bearing is fixed.

3. A valve comprising a casing having an opening therein and an internal shoulder at the inner end of the opening, a tubular bearing in the opening having a shoulder at its outer end engaging the shoulder of the casing, a valve provided with a tubular and internally threaded extension movable in said bearing, means engaging the threads of the valve extension for operating said valve, and means carried by the casing and engaging the bearing to secure the said bearing in position.

4. In a valve, a casing, a bonnet on the casing having an externally threaded extension, a handle having an internally threaded tubular extension engaging the threaded extension of the bonnet, said handle having an opening of less diameter than the internal diameter of the tubular extension, a valve stem extending through the bonnet, its extension and the opening of the handle and provided with a collar within the tubular extension of the bonnet, and means engaging the handle and the end of the valve stem projecting through the handle for securing the handle to said stem.

5. In a valve, a casing having a valve seat and provided with an opening and an internal shoulder adjacent the opening, a bearing in the opening having a shoulder engaging the shoulder of the casing, a member secured to the casing and clamping the bearing immovably in the opening, a valve having a portion mounted to slide but not turn in the bearing, a valve stem, and a connection between the valve and stem to move the valve longitudinally of the stem, whereby when the clamping member and the stem are removed, the bearing and valve can be rotated to grind the valve on its seat.

6. In a valve, a casing having a valve seat and provided with an opening and an internal shoulder adjacent the opening, a bearing in the opening and having a polygonal bore and a shoulder engaging the shoulder of the casing, a member secured on the casing against the bearing, a valve having a hollow polygonal extension mounted in the bearing, the said extension being internally threaded, and a stem having its inner end threaded and engaging the threaded extension of the valve.

7. In a valve, a casing having a valve seat and provided with an opening and an internal shoulder adjacent the opening, the casing being externally threaded at said opening, a bearing in the opening and having a polygonal bore and a shoulder engaging the shoulder of the casing, a cap-shaped member having an internally threaded flange screwing on the casing at said opening, a valve having a hollow polygonal extension mounted in the bearing, the extension being internally threaded, and a stem having its inner end threaded and engaging the threaded extension of the valve.

8. A valve, comprising a casing having a double valve seat and provided with oppositely arranged openings and an internal shoulder adjacent each opening, a closure for one of the openings and having a shoulder engaging the shoulder of the casing, a bearing in the other opening and having a shoulder engaging the shoulder of the casing, a member secured to the casing and resting against the bearing, a valve having a hollow internally threaded extension mounted to slide but not to turn in the bearing, a valve stem having its inner end threaded and engaging the threaded extension of the valve, the said stem extending through the said closure, a second valve secured to the stem at the side of the valve seat opposite the first valve, and means for operating the valve stem.

9. A valve, comprising a casing having a double valve seat and provided with oppositely arranged openings and an internal shoulder adjacent each opening, the casing being externally threaded at each opening, a bonnet having a central opening and externally threaded tubular extension, said bonnet being internally threaded and screwing on the casing at one opening, a gland in the opening of the bonnet, a bearing in the other opening of the casing and having a shoulder engaging the shoulder of the casing, a member internally threaded and screwing on the casing and engaging the bearing, a valve having an internally threaded extension mounted in the bearing to slide but not to turn therein, a valve stem having its inner end threaded and engaging the threaded extension of the valve, the stem projecting through the gland and the extension of the bonnet, a valve secured to the valve stem at the side of the valve seat opposite the first valve, a handle having an internally threaded extension screwing on the extension of the bonnet, the stem projecting through the handle and having a collar within its extension, and means for securing the stem to the handle.

In testimony whereof I have signed my name to this specification in the presence of two subscribing witnesses.

ARCHIE E. CRUM.

Witnesses:
J. B. CLARK,
SAMUEL TAYLOR.